United States Patent [19]

Estabrook

[11] 4,199,455

[45] Apr. 22, 1980

[54] COMBINED MAGNETIC AND CYCLONIC SEPARATING APPARATUS

[75] Inventor: Mark R. Estabrook, Rockford, Ill.

[73] Assignee: Barnes Drill Co., Rockford, Ill.

[21] Appl. No.: 670,458

[22] Filed: Mar. 25, 1976

[51] Int. Cl.2 .......... B01D 35/06

[52] U.S. Cl. .......... 210/223; 209/219; 210/252; 210/305; 210/512 R

[58] Field of Search .......... 209/218, 219, 220; 210/195, 223, 262, 305, 512

[56] References Cited

U.S. PATENT DOCUMENTS

| | | | |
|---|---|---|---|
| 2,188,516 | 1/1940 | Payne | 209/219 |
| 2,188,517 | 1/1940 | Payne | 209/219 |
| 2,711,249 | 6/1955 | Laurila | 209/219 |
| 2,717,080 | 9/1955 | Anderson | 209/219 X |
| 2,758,715 | 8/1956 | Fowler | 209/219 X |
| 3,349,918 | 10/1967 | Ike | 210/223 |
| 3,456,797 | 7/1969 | Marriott | 210/223 |
| 4,001,118 | 1/1977 | Enzmann | 210/223 |

*Primary Examiner*—Theodore A. Granger
*Attorney, Agent, or Firm*—Leydig, Voit, Osann, Mayer & Holt, Ltd.

[57] ABSTRACT

The underflow of a cyclonic separator is discharged onto the drum of a magnetic separator and is confined to flow around the drum along a narrow channel so as to filter the underflow through swarf collected on the drum within the channel while preventing the underflow from washing across and disturbing the swarf collected outside of the channel.

8 Claims, 4 Drawing Figures

Fig. 3.
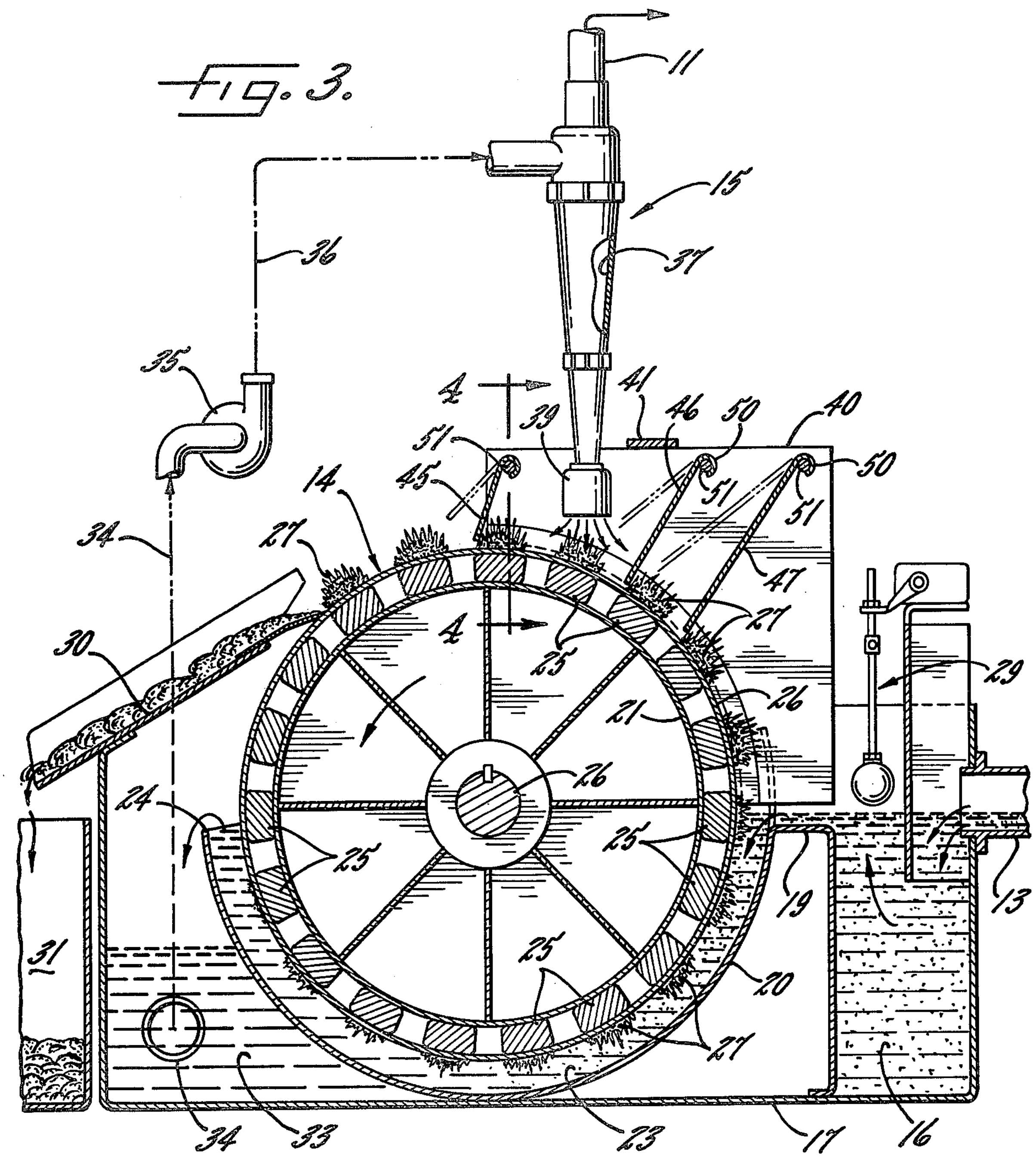
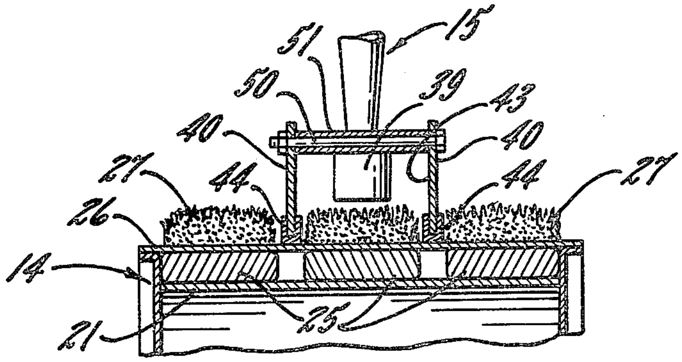
Fig. 4.

COMBINED MAGNETIC AND CYCLONIC SEPARATING APPARATUS

BACKGROUND OF THE INVENTION

This invention relates to apparatus for cleaning liquids such as machine tool coolants which contain highly abrasive particles that usually are both ferrous and non-ferrous in nature so as to be both magnetic and non-magnetic. One such apparatus is disclosed in Marriott U.S. Pat. No. 3,456,797 and comprises the combination of a rotatable magnetic drum and a cyclone separator.

In such an arrangement, most of the magnetic particles in the dirty liquid are collected as swarf on the magnetic drum and the partially cleaned liquid then is delivered to the cyclone separator for final cleaning. As is well known, a cyclone separator produces a clean flow of liquid and also discharges a downward stream of dirty liquid—commonly called underflow—which contains particles separated from the liquid delivered to the cyclone.

In the apparatus disclosed in the Marriott patent, the dirty underflow of the cyclone is discharged onto the upper side of the magnetic drum so that the underflow may be strained through the swarf collected on the drum. In this way, the non-magnetic particles in the underflow are filtered by and captured in the collected swarf and thus the underflow itself is cleaned prior to being mixed with additional incoming dirty liquid flowing to the drum.

SUMMARY OF THE INVENTION

The general aim of the present invention is to provide a combined magnetic and cyclonic separating apparatus of the foregoing type in which the underflow from the cyclone is discharged onto only a small area of the magnetic drum and through only part of the collected swarf so as to effect filtering of the underflow without the underflow disturbing the swarf which has been collected on the major area of the drum.

A more detailed object is to achieve the foregoing by restricting the discharge of underflow to a narrow channel around the drum and thereby prevent the underflow from washing across the swarf which has collected on the major length of the drum.

The invention also resides in the unique provision of pivoted baffles within the channel to force the underflow to pass intimately through the swarf in the channel and to help prevent the underflow from splashing out of the channel.

These and other objects and advantages of the invention will become more apparent from the following detailed description when taken in conjunction with the accompanying drawings.

BRIEF DESCRIPTION OF THE DRAWINGS

FIG. 3 is a fragmentary cross-section taken substantially along the line 3—3 of FIG. 2.

FIG. 4 is a fragmentary cross-section taken substantially along the line 4—4 of FIG. 3.

DETAILED DESCRIPTION OF THE PREFERRRED EMBODIMENT

Figure 1:
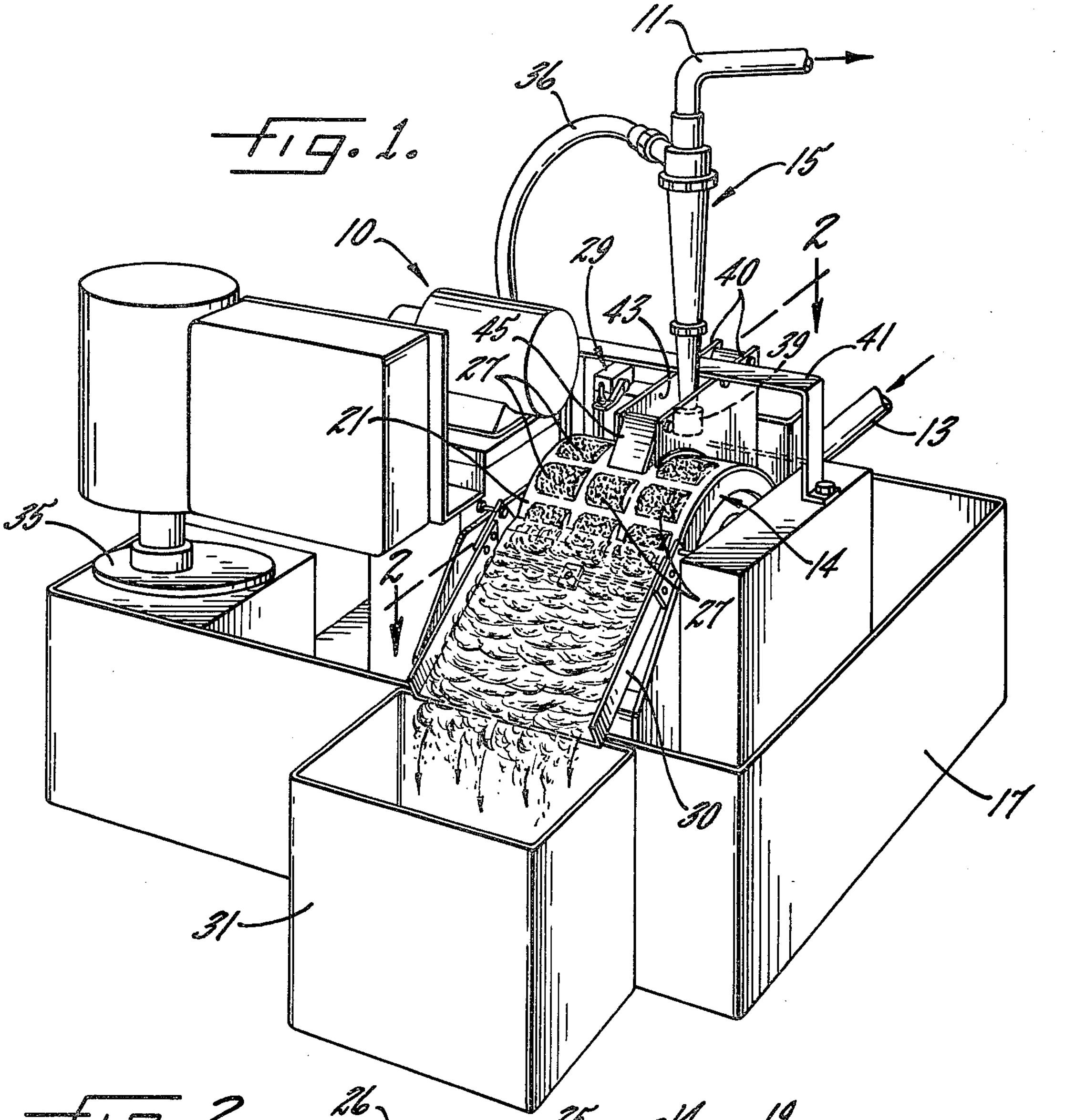
FIG. 1 is a perspective view of a combined magnetic and cyclonic separating apparatus incorporating the unique features of the present invention.
Figure 2:
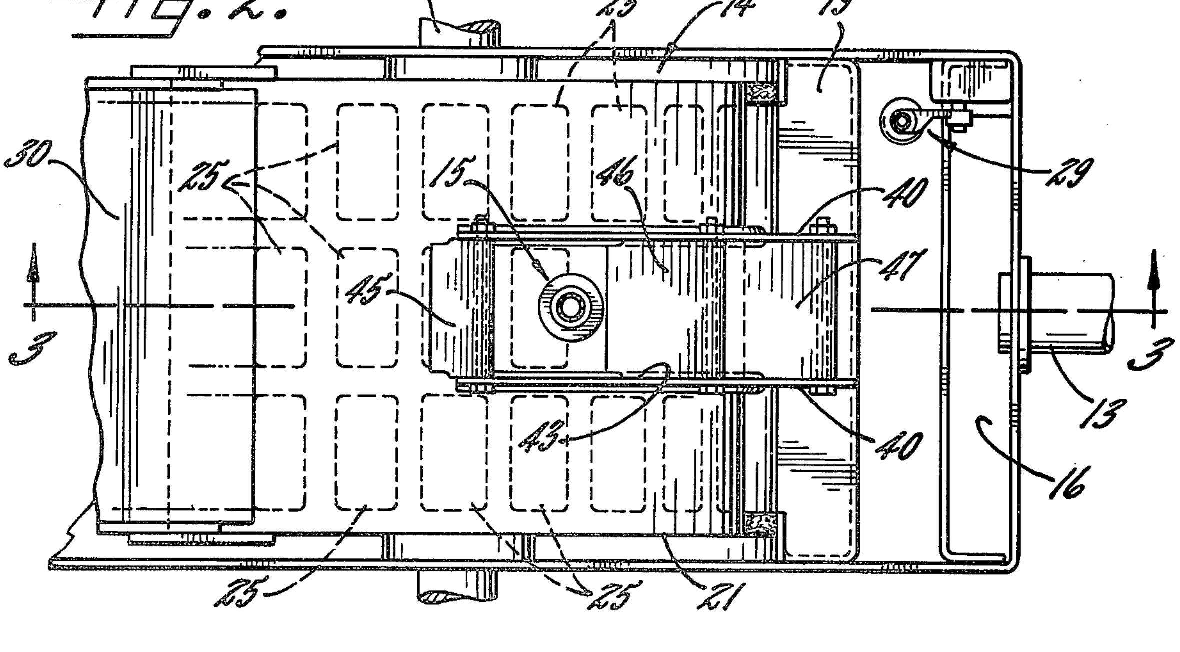
FIG. 2 is an enlarged fragmentary cross-section taken substantially along the line 2—2 of FIG. 1.

As shown in the drawings for purposes of illustration, the invention is embodied in a coolant cleaning apparatus 10 for supplying one or more machines (not shown) with clean coolant through a pipe 11 and receiving dirty coolant through a return pipe 13 leading to the cleaning apparatus. The liquid in this return line may contain entrained metal chips, worn-away abrasive particles from the tool or tools of the machine, and other contaminants such as particles of a bonding material for holding the abrasive particles of the tool. The exact composition, of course, varies with the type of tool being used and the type of workpiece being machined, and the volume of flow may vary from 20 gallons per minute to 120 gallons or more.

In general, the cleaning apparatus 10 comprises a magnetic separator 14 and a cyclone separator 15. The magnetic separator precleans the dirty coolant sufficiently to permit high pressure pumping of the coolant to the cyclone for final, more effective cleaning by the cyclone. Liquids and solids discharged from the cyclone as underflow are returned to the magnetic separator for re-cycling, thereby facilitating the disposal of the underflow. Moreover, this underflow is strained through the dense mass of collected solid particles—commonly called swarf—on the magnetic separator to remove at least some of the particles, both magnetic and non-magnetic, from the underflow before the latter is re-cycled through the magnetic separator.

More specifically, the return line 13 empties into a baffled compartment 16 (FIG. 3) formed within a tank 17 and adapted to spill the liquid forwardly over a wall 19 into the usual curved trough 20 of the magnetic separator 14. The latter includes a rotary magnetic drum 21 which is supported in the tank in spaced relation with the trough so as to define a flow path at 23 extending beneath the drum. The dirty liquid from the return line 13 spills over the wall 19 into the entry end of the path 23, flows beneath the drum 21 and then spills over a lip 24 on the left end of the trough and defining the discharge end of the flow path.

To create a magnetic field in the trough 20 for attracting particles to and collecting them on the drum 21, permanent magnets 25 are disposed inside of the drum and are located directly adjacent the outer metal shell 26 (FIGS. 3 and 4) which defines the outer periphery of the drum. Herein, the drum is shown as including three axially spaced rows of circumferentially spaced magnets although more than three rows of magnets often will be employed.

The details of construction and operation of the magnetic separator 14 are well known to those familiar with the art and thus need not be specified herein. It will suffice to note that the drum 21 is partially submerged in the liquid and is adapted to be rotated in a counterclockwise direction about the axis of a shaft 26 (FIG. 3) extending centrally through the drum. The liquid flowing under the drum carries entrained particles through the magnetic fields of the magnets 25 so that most of the magnetic particles are collected as at 27 on the periphery of the drum before the liquid reaches and spills over the discharge lip 24.

In this instance, the drum 21 is not rotated continuously but instead is turned intermittently or with a step-by-step motion and remains stationary in the trough 20 for relatively long intervals. During the time the drum is stationary, the particles or swarf 27 build up on that portion of the drum that is disposed in the liquid and thus relatively large clumps of swarf form within the flow path 23. These clumps are formed primarily by magnetic particles which are attracted directly to the drum but also consist partially of some non-magnetic particles which are strained from the liquid by the collected magnetic particles.

As the swarf 27 in the path 23 increases in volume and density, it restricts the flow of liquid beneath the drum 21 and thus causes the liquid in the compartment 16 to rise. When the liquid in the compartment reaches a certain level, a float-actuated mechanism indicated generally at 29 in FIG. 3 produces a signal to cause a drive means (not shown) to rotate the drum counterclockwise and lift the collected swarf 27 out of the flow path 23 so that the liquid in the compartment may flow more freely beneath the drum and allow the level in the compartment to fall. In response thereto, the mechanism 29 causes the drum to stop so that additional swarf may collect on the drum and build up in the flow path 23. When the drum rotates, that swarf which has been lifted out of the liquid is scraped off of the upper side of the drum by the upper edge of a downwardly inclined chute 30. The lower end of the chute is disposed over a waste receptacle 31 to dump the swarf for eventual disposal.

The liquid flowing past the drum 21 and spilling over the discharge lip 24 enters a compartment 33 (FIG. 3) in the tank 17 and is sucked through a line 34 by a high pressure pump 35. The pump then delivers the liquid through a line 36 to the cyclone 15. Such a cyclone may also be of conventional construction and includes a conical chamber 37. Liquid is admitted into the chamber generally tangent thereto and spirals around the chamber while traveling progressively downwardly. The resulting centrifugal separating action causes the denser contamination or underflow to follow the conical chamber to a lower discharge spout 39 while clean liquid flows out along the axis of the cone and upwardly into the supply pipe 11.

Contamination discharged from the spout 39 as underflow consists of a mixture of liquid, non-magnetic particles from the dirty coolant, and fine magnetic particles which may have passed by the drum 21. In order to recover as much of the liquid as possible, the underflow is not simply discarded but instead is re-cycled past the drum for removal of the non-magnetic particles and the magnetic "fines". For this purpose, the cyclone 15 is mounted above the drum with the discharge spout 39 located closely adjacent the drum and rearwardly of the axis thereof. Thus, the underflow from the spout is discharged onto the drum so that the magnetic fines may be captured by the magnets 25. The underflow travels clockwise around the drum toward the entry end of the flow path 23 and, as an incident thereto, the underflow passes through and is strained by the swarf 27 which has collected on the upper rear quadrant of the drum. Accordingly, non-magnetic particles in the underflow are caught by the swarf and ultimately are scraped off of the drum by the chute 30.

In accordance with the present invention, the underflow discharged from the cyclone 15 and onto the drum 21 is allowed to travel around only a comparatively narrow band of the drum and is not permitted to wash across the entire length of the drum. As a result, the underflow washes only through the swarf 27 which has collected within the narrow band and does not disturb the swarf which is located outside of the band. There is no danger, therefore, of the underflow washing any of that swarf back downwardly into the flow path 23 and thus those non-magnetic particles which may already have been caught are retained in the swarf.

To achieve the foregoing, two plates 40 are suspended above the upper rear quadrant of the drum 21 by means indicated generally at 41. The plates are located on opposite sides of the discharge spout 39 of the cyclone 15 and define a narrow channel 43 for confining the underflow discharged from the spout. Each plate is formed with a lower edge which is curved in accordance with the curvature of the drum and which is fitted with a flexible gasket 44 (FIG. 4) adapted to rub lightly against the drum and seal the lower side of the channel 43.

Preferably, the cyclone 15 is centered over the middle row of the three rows of magnets 25 while the plates 40 overlie the spaces between the center row and the two outboard rows (see FIG. 4). As a result, the plates do not scrape the collected clumps 27 from the drum when the latter is indexed but instead one row of clumps passes between the plates while the other two rows travel along the outboard sides of the plates.

Each plate 40 extends forwardly beyond the forward end of the cyclone 15 and extends rearwardly and downwardly to a point just short of the wall 19. In keeping with the invention, the forward end of the channel 43 defined between the plates is closed by a pivoted splash baffle 45 (FIG. 3) while the rear portion of the channel is closed by one or more pivoted baffles, there being two such baffles 46 and 47 shown in the present embodiment. Each baffle is made of ferrous metal and is positioned with its lower end located closely adjacent the periphery of the drum 21. A curl 50 (FIG. 4) is formed at the upper end of each baffle and is hooked around a horizontal pin 51 which extends between the plates 40 so as to mount the baffle for pivoting about an axis paralleling that of the drum.

The forward baffle 45 acts as a splash guard to prevent the underflow being discharged from the spout 39 from spilling forwardly over the drum 21 and proceeding toward the chute 30. Each rear baffle 46 and 47 serves to force the underflow downwardly toward the drum and thus causes the underflow to wash through the swarf 27 for effective straining rather than merely passing over the top of the swarf in the channel 43. The baffles are attracted toward the magnets 25 and, when the drum is indexed, each baffle attempts to follow the leading edge of its underlying magnet and thus automatically swings upwardly to the position shown in phantom in FIG. 3. In this way, the magnets pivot upwardly away from the swarf 27 and do not scrape the swarf from the drum when the latter is indexed. After each baffle has pivoted upwardly a certain distance, it is attracted to the leading edge of the next succeeding magnet and thus returns downwardly to the position shown in full lines in FIG. 3. For the most part, downward swinging of each baffle takes place during the time the space between two adjacent magnets is located beneath the baffle and thus the downwardly swinging baffle does not significantly disturb the swarf 27.

From the foregoing, it will be apparent that the present invention brings to the art combined magnetic and cyclonic separating apparatus 10 in which the underflow from the cyclone 15 is channeled over only a comparatively narrow length of the drum 21 and washes only through the swarf 27 overlying the center row of magnets 25. Accordingly, the swarf overlying the outboard rows of magnets is not disturbed by the underflow. As a result, the underflow does not wash away so-called "tramp" oil and non-magnetic particles such as graphite which inherently have a non-magnetic affinity for the drum and which tend to collect on the drum in the spaces located circumferentially between the magnets of the outboard rows. As a result, the contamination which has a natural non-magnetic affinity for the drum is left on those portions of the drum located outboard of the channel 43 and ultimately is scraped from the drum by the chute 30.

I claim:

1. Apparatus for cleaning dirty liquid containing magnetic and non-magnetic particles, said apparatus comprising a trough, a rotary drum disposed in said trough and having at least two axially spaced rows of angularly spaced magnets, said drum cooperating with said trough to define a flow path for liquid to pass beneath said drum and through the magnetic field around the drum for collection of the magnetic particles on the drum, said drum and said trough coacting to form an entry end for said path on one side of said drum and a discharge end on the other side, said drum being rotatable in a direction to raise collected particles out of said liquid at said entry end, a cyclone separator for receiving liquid and particles passing from said discharge end and having a spout for discharging a downward stream of liquid and particles, said spout being located above said drum to discharge said stream onto the collected particles on the upper side of said drum for return of said stream around said drum toward said entry end, the improvement in said apparatus comprising, a pair of plates mounted above said drum and spaced from one another along the axis of the drum, said plates being located on opposite sides of said spout and defining a channel having a width substantially equal to the width of one of said rows of magnets, said channel receiving the downward stream from said spout and being substantially centered with respect to said one row of magnets so as to confine said downward stream to said one row as said stream passes onto said drum and around toward said entry end.

2. Apparatus as defined in claim 1 in which said drum includes three axially spaced rows of magnets, said plates overlying the spaces between the center row and the outboard rows.

3. Apparatus as defined in claim 1 in which the lower edges of said plates are curved substantially in accordance with the curvature of said drum, and sealing gaskets on the lower edges of said plates and disposed in contact with the periphery of said drum.

4. Apparatus as defined in claim 1 in which said plates extend forwardly and rearwardly beyond said spout, baffles located between said plates and disposed forwardly and rearwardly of said spout, each baffle having a lower end disposed adjacent the periphery of said drum, and means mounting said baffles for pivoting about axes substantially paralleling the rotational axis of said drum.

5. Apparatus as defined in claim 4 in which at least two baffles are disposed rearwardly of said spout.

6. Apparatus as defined in claim 4 in which each of said baffles has a width substantially equal to the width of said channel.

7. Apparatus for cleaning dirty liquid containing magnetic and non-magnetic particles, said apparatus comprising a trough, a rotary magnetic drum disposed in said trough and cooperating therewith to define a flow path for liquid to pass beneath said drum and through the magnetic field around the drum for collection of the magnetic particles on the drum, said drum and said trough coacting to form an entry end for said path on one side of said drum and a discharge end on the other side, said drum being rotatable in a direction to raise collected particles out of said liquid at said entry end, a cyclone separator for receiving liquid and particles passing from said discharge end and having a spout for discharging a downward stream of liquid and particles, said spout being located above said drum to discharge said stream onto the collected particles on the upper side of said drum for return of said stream around said drum toward said entry end, the improvement in said apparatus comprising, a pair of plates mounted above said drum and spaced from one another along the axis of the drum, said plates being located on opposite sides of said spout and defining a circumferentially extending channel having a width substantially less than the length of said drum, said channel receiving the downward stream from said spout and confining said stream to a short length of the drum, a baffle located between said plates and having a lower end located adjacent the periphery of the drum, and means mounting said baffle for pivoting about an axis substantially paralleling the rotational axis of said drum.

8. Apparatus for cleaning dirty liquid containing magnetic and non-magnetic particles, said apparatus comprising a trough, a rotary magnetic drum disposed in said trough and cooperating therewith to define a flow path for liquid to pass beneath said drum and through the magnetic field around the drum for collection of the magnetic particles on the drum, said drum and said trough coacting to form an entry end for said path on one side of said drum and a discharge end on the other side, said drum being rotatable in a direction to raise collected particles out of said liquid at said entry end, a cyclone separator for receiving liquid and particles passing from said discharge end and having a spout for discharging a downward stream of liquid and particles, said spout being located above said drum and nearer to said entry end than to said discharge end so as to discharge said stream onto the collected particles on the upper side of said drum for return of said stream around said drum toward said entry end, the improvement in said apparatus comprising, a pair of plates mounted above said drum and spaced from one another along the axis of the drum, said plates being located on opposite sides of said spout and each having a curved lower edge extending around said drum from a point located beyond said spout to a point located adjacent the entry end of said flow path, said plates defining a circumferentially extending channel having a width substantially less than the length of said drum, said channel receiving the downward stream from said spout and confining said stream to a short length of the drum.

* * * * *